METHOD AND APPARATUS FOR MANUFACTURING OPTICAL LENSES
Filed July 24, 1964
Fig. 1.
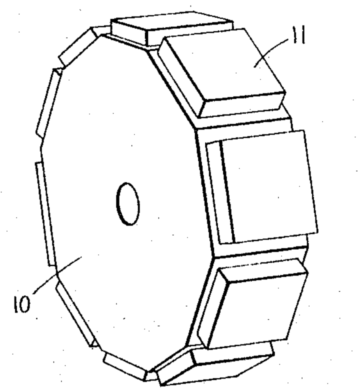
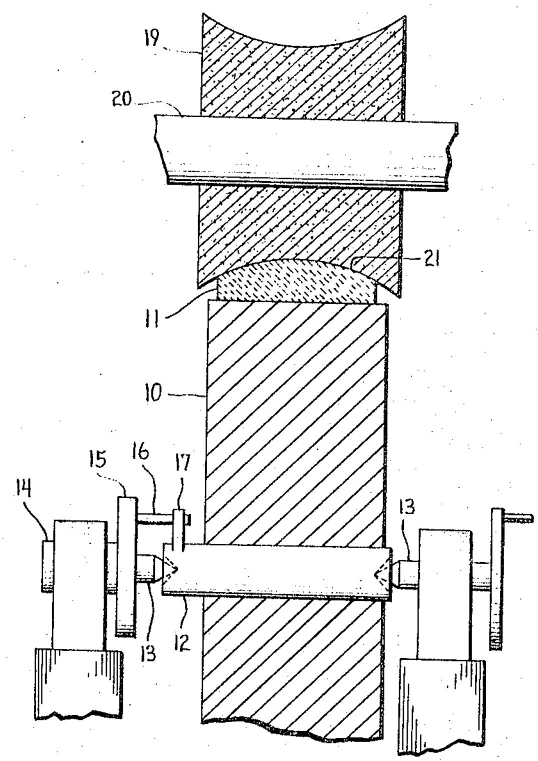
Fig. 2.
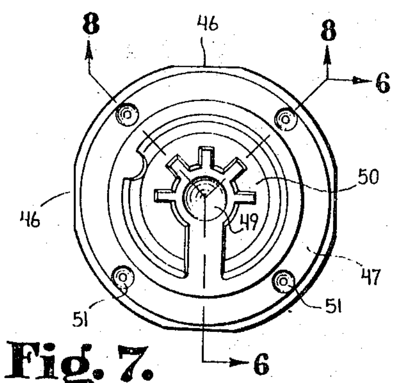
Fig. 7.
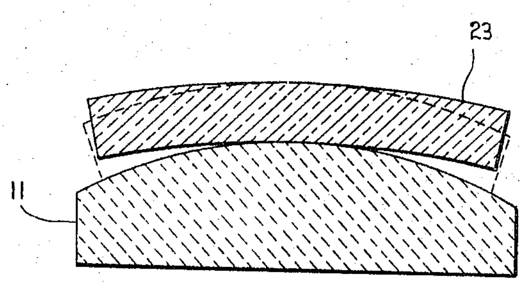
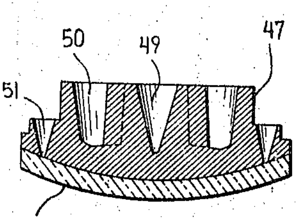
Fig. 8.
Fig. 3.
INVENTORS
TRACY H. CALKINS and
FRANK E. DUCKWALL
BY
Lockwood, Woodard, Smith & Weikart
Attorneys

METHOD AND APPARATUS FOR MANUFACTURING OPTICAL LENSES

Filed July 24, 1964

INVENTOR.
TRACY H. CALKINS and
FRANK E. DUCKWALL
BY
Lockwood, Woodard, Smith & Weikart
Attorneys INVENTORS.
TRACY H. CALKINS and
FRANK E. DUCKWALL
BY
Lockwood, Woodard, Smith & Weikart
Attorneys

METHOD AND APPARATUS FOR MANUFACTURING OPTICAL LENSES

Filed July 24, 1964

INVENTOR.
TRACY H. CALKINS and
FRANK E. DUCKWALL

BY Lockwood, Woodard, Smith & Weikart
Attorneys

United States Patent Office 3,348,340

Patented Oct. 24, 1967

3,348,340

METHOD AND APPARATUS FOR MANUFACTURING OPTICAL LENSES

Tracy H. Calkins and Frank E. Duckwall, Indianapolis, Ind., assignors to Textron, Inc., Providence, R.I., a corporation of Rhode Island Filed July 24, 1964, Ser. No. 384,873

5 Claims. (Cl. 51—91)

This invention relates generally to a method of and apparatus for making lenses for spectacles and more particularly to a method of and apparatus for making lenses of the type having an astigmatic curve or cylinder correction applied to the concave surface thereof.

It is conventional to provide single vision lenses or bifocal lenses having the property of correcting astigmatic conditions of the eye. Such lenses include either a convex or a concave surface ground and polished to have what is known as an astigmatic curve or cylinder correction. Such surfaces have different curvatures in two principal meridians and are toric curves commonly referred to as cylinders. When single vision lenses are manufactured in quantity, the toric curve has usually been formed on the convex surface of the lens. In the case of bifocal lenses, the toric curve is formed on either the convex or concave surface, depending upon the particular type of bifocal lens. One type of bifocal lens is provided with near and distance lens portions ground on the concave surface of the lens by the lens manufacturer. The optician receives lens blanks ground in this manner and then grinds the astigmatic curve or cylinder correction on the convex surface of the lens according to the particular prescription at hand. When the bifocal lens blank is manufactured with the near and distant lens portions formed on the convex surface of the lens blank, the optician grinds the blank on the concave side thereof in order to form the astigmatic curve or cylinder correction.

When producing such cylindrical curves, the optician uses "prescription shop" equipment which equipment is costly to operate, and also tends to produce a lens surface of a lesser quality compared to that produced by a manufacturing method. This prescription shop procedure, however, is necessary in filling bifocal prescriptions. In the case of single vision lenses, the opticial purchases from the manufacturer finished lenses or semi-finished cylinders. If the first, he orients the axis of the cylinder as required and edges it to fit the frame. If the second, he grinds and polishes a sphere on the surface opposite the semi-finished surface and produces a finished lens which in turn is edged to fit the frame. Seldom, if ever, does he surface the cylinder portion of a single vision lens.

Single vision lenses are presently produced by manufacturers by mass production methods having the astigmatic curve or cylinder correction applied to the convex surface of the lens blank. The manufacturers employ what is commonly known as the "wheel method" for grinding the convex surfaces. United States Letters Patent No. 1,483,866, granted Feb. 19, 1924, to L. W. Bugbee illustrates the wheel method wherein a number of lens blanks are mounted on the periphery of a rotating wheel, and the convex surface is ground by means of a grinding wheel applied to the lens blanks as they rotate with the lens blank supporting wheel. The radius of rotation of the lens blanks determines the toric curvature as to one meridian of the blank and the grinding wheel surface is curved transversely thereof to provide the toric curvature of the lens blank on the other meridian thereof. In this manner astigmatic curves or cylinder corrections are formed by mass production methods. Such mass production methods are not feasible for use by opticians or so-called prescription shops because they do not have sufficient demand for lenses having the many prescribed cylinder corrections which would justify mass production methods. Thus, it is economical for prescription shops and opticians to obtain single vision lens blanks having the cylinder correction on the convex side of the lens from lens blank manufacturers, but where it is required that the cylinder correction be applied to the concave surface of the lens, it is necessary for the prescription shop or optician to use costly machines and methods in order to fabricate lenses of this type. This is because mass production methods have not been developed by manufacturers for manufacturing and selling lens blanks having the cylinder correction on the concave side of the lens.

Accordingly, an important object of this invention is to provide a method of making single vision lenses having a toric curve surface on the concave side and a spherical surface on the convex side.

A further object of the invention is to provide a method of making a sphero-cylinder lens in finished form whereby the optician need only provide proper edging to fill a prescription.

Another object of this invention is to provide a method of making lenses having an astigmatic curve or toric curve or cylinder correction applied to the concave surface thereof, which method is adaptable for mass production of such lenses.

Still another object of this invention is to provide a method according to the preceding objects incorporating a procedure for reducing the grinding time required for applying an astigmatic curve or cylinder correction to the concave surface of a lens, thereby to reduce the wear on grinding tools and the consequent inaccuracies in lens surface curvature resulting from such wear.

A further object of this invention is to provide a method in accordance with the foregoing objectives wherein it is not necessary to block the lens or cement the lens to a holder in order to grind the lens.

Various method and apparatus can be conceived for grinding and for polishing the concave surface of a lens. For example, a toric configuration might be ground and polished on the concave surface of a lens by moving the lens back and forth against a fixed abrading tool and then against a fixed polishing tool. Such a procedure, however, results in an imperfect surface having waves or streaks which are the result of the repeated stopping and starting or repeated changing of direction involved. Also, this procedure causes rapid uneven wear on the tools involved.

Consequently, another object of the present invention is to provide an improved method and apparatus for grinding the concave surface of a lens.

A further object of the invention is to provide an improved method and apparatus for polishing the concave surface of a lens.

Still a further object of the present invention is to provide a rapid and accurate method and apparatus for grinding and polishing the concave surface of a lens to provide a toric configuration.

Still another object of the present invention is to provide a method and apparatus for grinding and polishing the concave surface of a lens wherein the apparatus involved is relatively simple and inexpensive.

Related objects and advantages will appear as the description proceeds.

The full nature of the invention will be understood from the accompanying drawings and the following description and claims:

FIG. 1 is a perspective view of a wheel having ceramic blocks mounted thereon for grinding.

FIG. 2 is a partial front elevation of apparatus including the wheel of FIG. 1 for forming convex toric surfaces on the ceramic blocks.

FIG. 3 is a cross section illustrating a ceramic block formed by the apparatus of FIG. 2 and illustrating thereon, in solid lines, a lens blank which is to be heated and sagged into the position illustrated in dotted lines.

FIG. 7 is a top plan view of the block formed by the apparatus illustrated in FIG. 6.

FIG. 8 is a cross section taken on line 8—8 of FIG. 7.

Figure 5B:
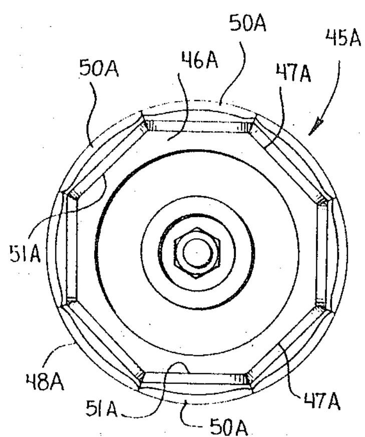
FIG. 5B is a front elevation of the apparatus illustrated in FIG. 5A.

Referring to the drawings, FIGS. 1 and 2 illustrate apparatus for performing the first step in the method as provided in accordance with this invention. According to conventional practice, lens blank manufacturers purchase lens blanks from glass manufacturers which have been molded by the use of heat and presses to have concave and convex surfaces having different radii. The lens blank manufacturer then finishes the lens blank by conventional grinding processes and supplies the blanks to opticians and prescription shops. In the case of lens blanks supplied to opticians and prescription shops for fabricating into spectacle lenses having concave astigmatic curves or cylinder corrections, it is not feasible for the lens blank manufacturer to obtain lens blanks molded to provide such concave surfaces. This is because there are a great number of combinations of concave toric curves necessary for making the astigmatic corrections prescribed by physicians and optometrists, and maintaining an inventory of molded lens blanks having such a great number of combinations of concave toric curves would not be feasible.

In accordance with this invention there is provided a wheel 10 in which are mounted a plurality of rectangular ceramic blocks 11. The wheel 10 may be mounted, as illustrated in FIG. 2, on a shaft 12 supported by a pair of centers 13 and driven in any suitable manner by a motor (not shown) connected to the shaft 14 which drives shaft 12 through disc 15, pin 16 and a yoke 17. For grinding a convex surface on the blocks 11, there is provided a grinding wheel 19 mounted on and driven by a shaft 20. By selecting the proper diameter for wheel 10 and by selecting the proper curvature of the grinding surface 21 of the grinding wheel 19, the blocks 11 may be ground to provide toric surfaces on the blocks 11 having curves of any desired values of curvature on both meridians of the blocks.

The blocks 11, as ground on the apparatus illustrated in FIGS. 1 and 2, are the counterparts of the desired concave toric surface of the lenses to be produced in accordance with a given prescription. When the blocks are removed from the wheel 10, they become permanent tools adapted for use in preshaping molded glass lens blanks. This preshaping, as will be described subsequently, eliminates the necessity of rough grinding molded lens blanks to the desired concave toric curvature.

Referring to FIG. 3 of the drawings, molded lens blanks, such as the blank 23, may be placed on a series of ground blocks 11, as illustrated in full lines. The series of ceramic blocks and the lens blanks supported thereon may be positioned on a conveyor and moved through a large furnace having controlled heating zones wherein the temperatures are controlled so that the glass becomes softened and the blanks sag downwardly into the dotted line position of FIG. 3. The lens might be supported as shown in FIG. 3 and the outside portion sagged downwardly or, alternatively, the outside of the lens might be supported and the inside sagged downwardly. Thus, the molded lens blanks are reshaped to fit the curved surface of the ceramic blocks and the concave surfaces of the lens blanks have the toric curvature corresponding to the curvature of the ceramic block. In this manner the ceramic blocks may be used repeatedly for preshaping the molded lens blanks. It is found that such preshaping of molded lens blanks produces a very accurate and flaw-free condition of the glass surface so that only a relatively few thousandths of an inch of glass has to be removed in order to obtain a lens surface which will polish quickly with the desired curvature and quality. It is to be noted that the molded glass blanks may be purchased by the lens blank manufacturer either in spherical form on the concave side or in cylindrical steps of one or more diopters in value so that the tooling procedures at the molded glass blank source may be reduced to a minimum, and the cost of the molded blanks is kept to a reasonable value.

Figure 4:
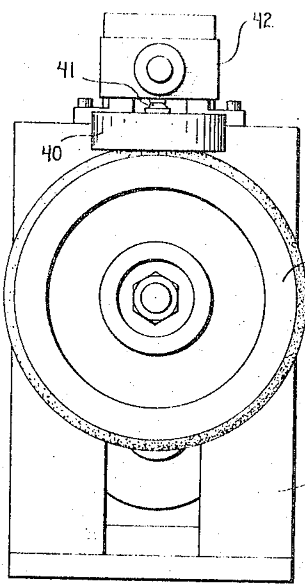
FIG. 4 is a front elevation illustrating apparatus for grinding a concave toric surface on the lens blank of FIG. 3 after it has been sagged as illustrated in FIG. 3.
Figure 5A:
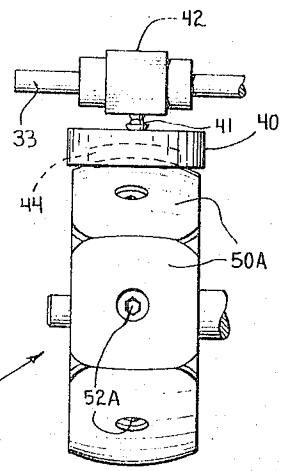
FIG. 5A is a fragmentary view similar to FIG. 5 of polishing apparatus embodying the present invention.
Figure 5:
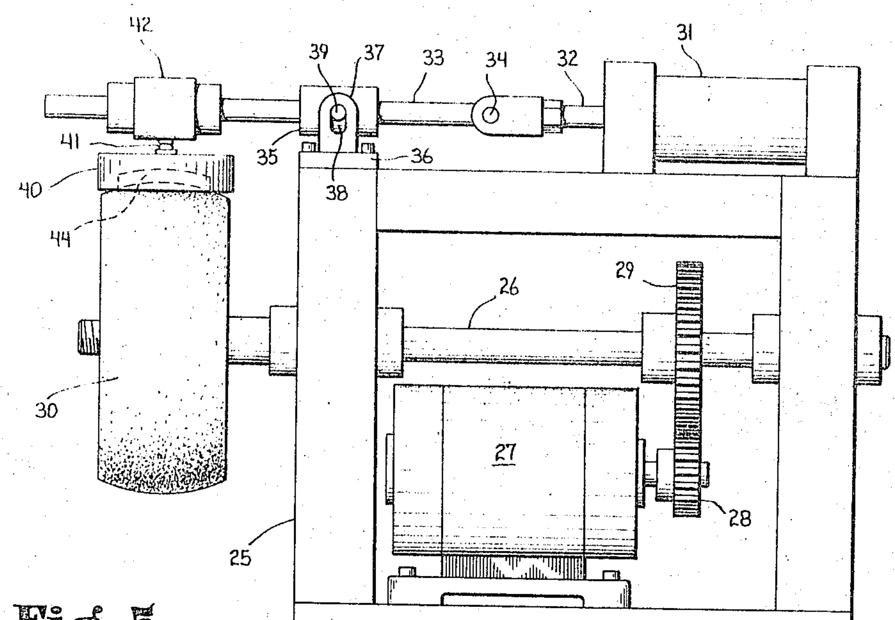
FIG. 5 is a side elevation of the apparatus illustrated in FIG. 4.

The next step in the method, as provided in accordance with this invention, comprises grinding the concave surface of the lens blank on the apparatus illustrated in FIGS. 4 and 5. This apparatus comprises a frame 25 in which is mounted for rotation a drive shaft 26. A motor 27 is mounted on the frame 25 and is provided with a driving pinion 28 which meshes with a shaft driving gear 29 fixed to shaft 26. A grinding wheel 30 is mounted on shaft 26 for rotation therewith. Since the lens blanks are preshaped to the desired curvature on their concave surface, the wheel 30 may have a grinding surface to fine grind the convex surface of the lens blank. Wheel 30 may be a metallic grinding wheel to which a fine garnet is applied. Such a wheel is found to have a relatively long life, because preshaping of the lens blank makes it necessary to remove only a relatively few thousandths of an inch of glass in order to complete the fine grinding. Alternatively, the wheel 30 may be constructed so that the outer convex area comprises a sintered metal impregnated with powdered diamonds. The preshaping of the lens blank results in the very important advantage that wheels of the type described are not subjected to any appreciable amount of wear. Consequently, there is no appreciable change of dimension of the wheels until after an unusually large number of lens blanks have been ground. Accordingly, a large number of lens blanks may be ground accurately to the prescribed curvature before it becomes necessary to use a new wheel.

For oscillating the lens blank crosswise of the wheel 30, there is provided an air operated cylinder and piston assembly 31 mounted on top of the frame 25. The piston rod 32 of the assembly 31 is connected to a rod 33 through a pivotal connection 34. For supporting rod 33, there is provided a guide member 35 mounted for vertical movement on a bracket 36 fastened to frame 25 and including a pair of uprights 37 having slots 38 therein for receiving pins 39 fixed to guide 35. A lens holder 40 is supported by means of a ball and socket joint 41 connected to a collar 42 fixed to shaft 33. The lens holder 40 is provided with a socket 44 shaped to receive the lens blank closely enough so that the lens blank cannot move within the holder.

It will be apparent that the air cylinder and piston 31 may be controlled by a suitable automatically operated valve (not shown) to oscillate the shaft 33 and therewith the holder 40 at a predetermined rate and through the desired amplitude. The radius of wheel 30 will be calculated to cause grinding of the lens on one meridian according to a prescribed curvature and the cross curvature of wheel 30 will be calculated to have the prescribed curvature for the other meridian of the lens blank. Therefore, rotation of wheel 30 and the oscillating motion of the lens holder 40 causes grinding of the concave surface of the lens blank to provide the prescribed astigmatic or cylinder correction.

The apparatus of FIGS. 4 and 5 operates with an efficiency comparable to or better than that obtainable by the wheel method used for grinding convex surface as described in the Bugbee patent. The lens blocking operation of the wheel method is eliminated, which reduces the over-all time period of grinding. It is found that grinding lens surfaces by the wheel method of the Bugbee patent requires a longer time than grinding the lens surfaces one at a time on the apparatus of FIGS. 4 and 5.

Apparatus similar to that shown in FIGS. 4 and 5 may be used for polishing the concave surfaces of lenses. The only difference would be that a polishing wheel would be substituted for wheel 30, and conventional lap material would be used for carrying out the polishing operation. In this case also it is found that such apparatus provides a saving of time. For example, polishing 8 lenses on a wheel of the type shown in the Bugbee patent requires approximately two hours; whereas, the apparatus of FIGS. 4 and 5 is capable of polishing a lens blank in a period of approximately ten minutes.

Referring to FIGS. 5A and 5B, there is illustrated polishing apparatus which is identical to the grinding apparatus of FIGS. 4 and 5 with the exception of the polishing wheel 45A. The polishing wheel 45A includes the wheel per se 46A which has a plurality of outwardly facing flat surfaces 47A. The convex polishing surface 48A is provided by a plurality of segments 50A each of which has an inwardly facing flat surface 51A engaging a respective flat surface 47A. The individual segments 60A are secured to the wheel 46A by screws 52A. If desired, the diameter of the polishing surface can be increased by placing spacers between the mating surfaces 47A and 51A.

It should be emphasized that the polishing surface 48A should be hard enough to hold the dimension established by the abrading tool 30. Any suitable hard optical polishing material can be used such as a suitable resin or composition. In order to insure that the completely assembled wheel with its segments has a proper radius and cross curvature, the assembled wheel can be turned and its external surface properly shaped on a milling machine. In other respects, the polishing procedure and apparatus is identical to the above described grinding procedure and apparatus.

When the concave surface of the lens blank has been polished, the convex surface of the lens may then be ground and polished to have a spherical curvature. In order to do this, a block, as illustrated in FIGS. 7 and 8, is formed on and attached to the concave side of the lens for holding it during the grinding and polishing operations. The block is formed so that its edges are in alignment with the edges of the lens blank, and as will be evident in FIG. 7, the periphery of the lens is preferably circular with one or more flat areas as indicated at 46. A flat area is useful as a reference for locating the cylinder axis and as a means by which the lens may be accurately located with reference to a block casting mold. The block 47 on one side is adhered to the lens blank 48, and on the other side is formed to provide a centering cavity 49 and various other cavities 50 and 51 which are useful in accurately mounting the block and lens on a holder during grinding operations. The block 47 may be formed of a low melting point alloy consisting of mixtures of such materials as tin, bismuth and indium. Alloys of this type have a melting point of approximately 136° F. whereby the block may be formed at relatively low temperature and removed by melting at a relatively low temperature.

Figure 6:
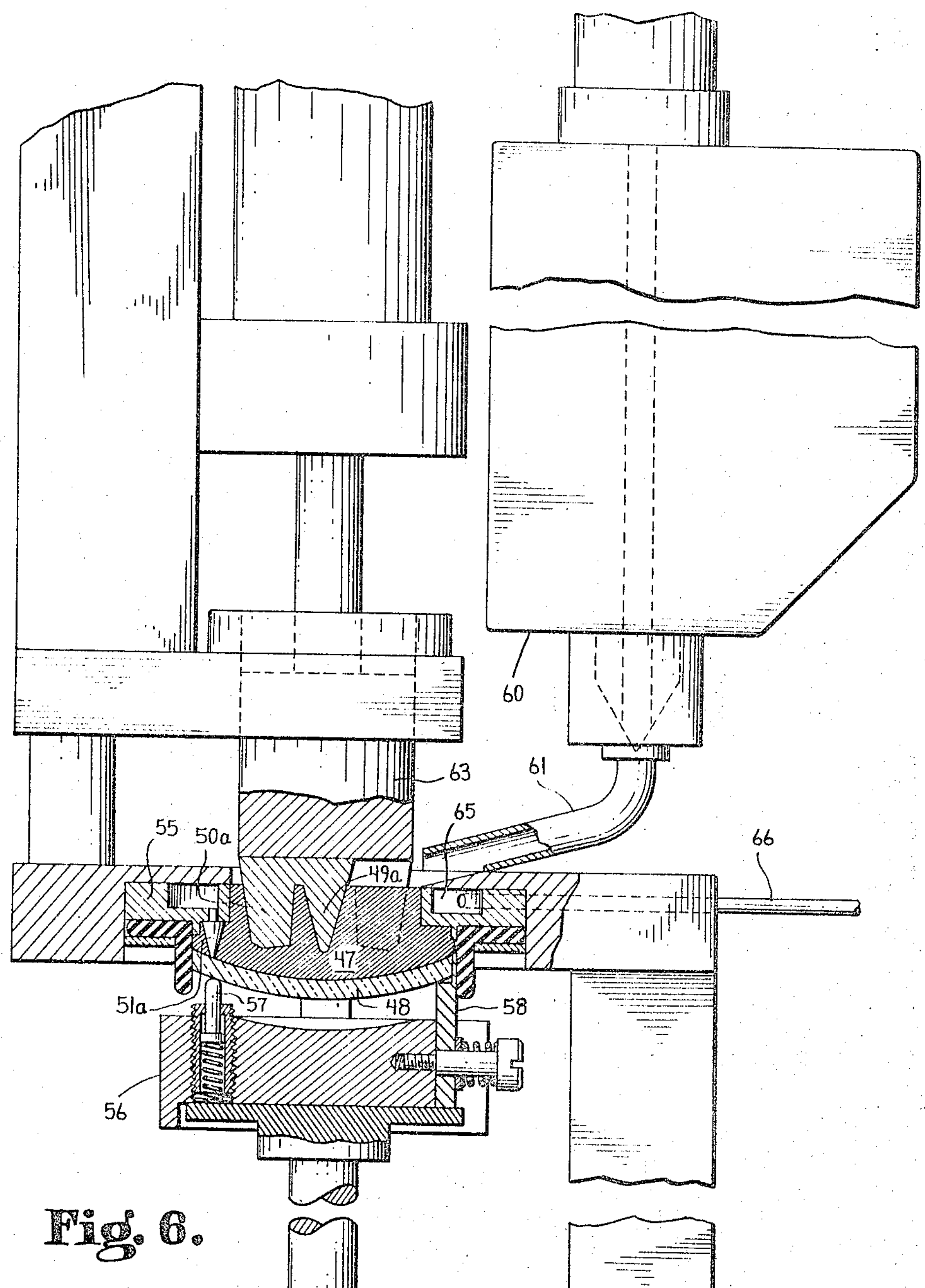
FIG. 6 is an elevation view partially in cross section illustrating apparatus for molding and attaching a low melting point metallic block to the concave surface of a lens blank, the cross section being taken on line 6—6 of FIG. 7.

For forming the block 47 and attaching it to the lens blank there is provided a mechanism such, for example, as that shown in FIG. 6.

Briefly, the apparatus of FIG. 6 includes a mold 55 which is open at both ends. A holder 56 is adapted by means of a plurality of pins 57 and a plurality of clamping members 58 to support the lens blank 48 in a position to close the lower end of the mold 55. The clamps 58 fit the flat areas 46 of the lens blank, thereby to provide accurate positioning of the lens with respect to the mold. A tank 60, containing a molten alloy, includes a discharge tube 61, the open end of which is disposed over and adjacent to the mold cavity so that molten alloy may be poured on to the concave surface of the lens blank. During such pouring, the portion 63 will be positioned above and clear of the mold leaving the upper end thereof entirely open. After the mold is filled to the desired level, portion 63 may be lowered to the position shown in FIG. 6. Portion 63 of the mold projects downwardly into the cavity and includes projections **49*a* and 50*a* which form the cavities 49 and 50, respectively, in the block 47. The mold 55 also includes projections 51*a* which form the cavities 51 in the block. Mold 55 also includes a cooling water chamber 65 through which cooling water is circulated by means of a pipe 66. Thus, after the molten metal is poured into the mold it may be cooled to solidify the alloy and form a block 47. The lens holder 56 may then be withdrawn from the mold, and the lens and the attached block may be extracted from the mold. It will be obvious to those skilled in the art that other molding apparatus may be used for forming the block 47**.

Figure 9:
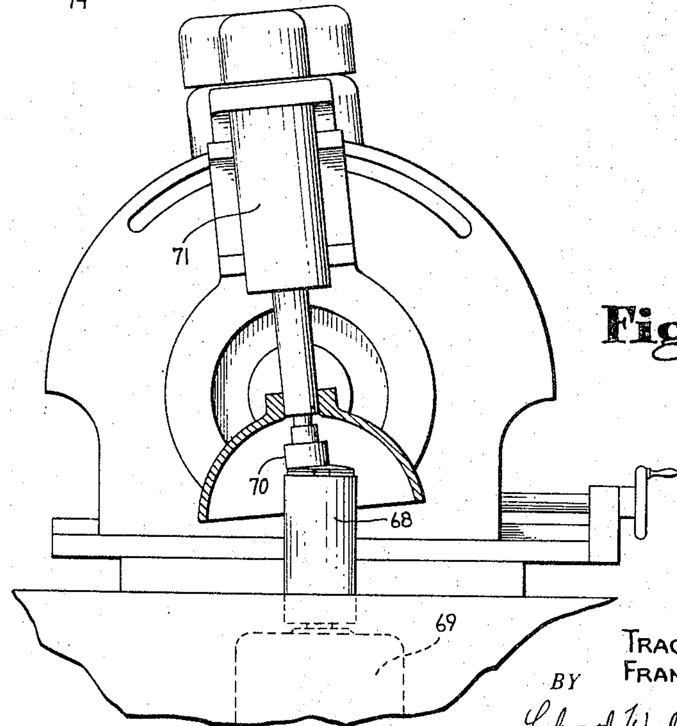
FIG. 9 is a front elevation view, partially in cross section, of apparatus adapted to rough grind a convex spherical surface on the lens blank.

FIG. 9 of the drawings illustrates apparatus for grinding a convex spherical surface on the lens blank. The cast block 47 may be dropped into an adapter 68 having protuberances (not shown) mating with the cavities 49, 50 and 51 for accurately centering the lens blank. The adapter 68 may be rotated by an electrical motor 69. A grinding tool 70 of the impregnated diamond type, for example, may be applied to the lens at a preset angle and rotated by a motor 71, thereby to grind the lens to a desired spherical curvature and thickness. This machine is a conventional generator.

Figure 10:
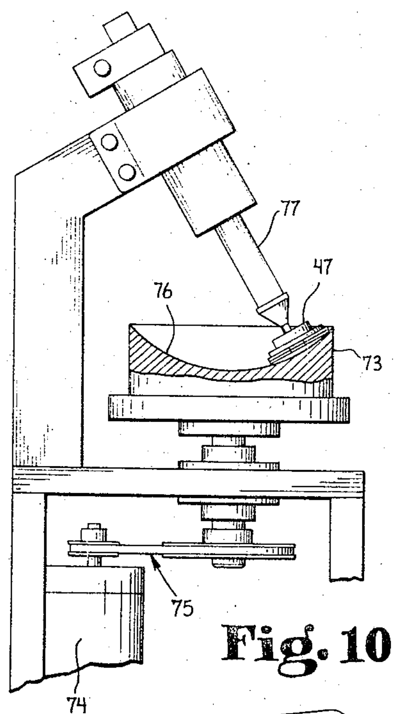
FIG. 10 is a side elevation view, partially in cross section, of apparatus adapted to fine grind the convex spherical surface on the lens blank.

The next step in the method is fine grinding on the apparatus of FIG. 10. This comprises a grinding tool 73 rotated by a motor 74 through the belt and pulley mechanism 75. The tool 73 is shaped to provide a concave grinding surface 76 having a curvature corresponding to the desired curvature of the convex surface of the lens blank. For holding the lens blank in proper relation to the grinding surface 76, there is provided a centering pin 77 having a tapered end portion adapted to fit into the cavity 49 of block 47. The apparatus of FIG. 10 is also conventional and its operation will be obvious to those skilled in the art.

Figure 11:
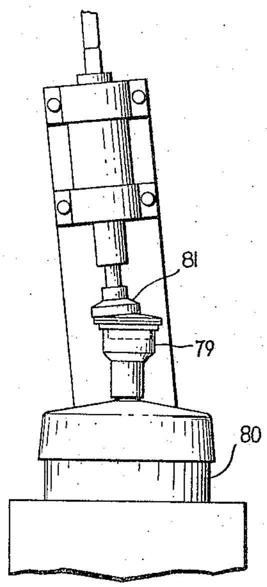
FIG. 11 is a front elevation view of apparatus adapted to polish the convex spherical surface of the lens blank.

For polishing the convex surface of the lens blank, the apparatus illustrated in FIG. 11 may be utilized. This comprises an adapter 79 rotated by a motor 80. The block 47 fits accurately within the adapter 79 and holds the convex surface of the lens for rotation. A polishing tool 81 is mounted as shown for polishing the lens surface as it rotates. This apparatus is also conventional, and its operation will be understood by those skilled in the art.

After a quantity of lenses have been finished, they may be placed in a basket and immersed in a hot water bath. The water being at a temperature above the melting point of the alloy of the block, the alloy will melt and collect in the bottom of the water tank where it may be drawn off and reused. The lenses may then be removed from the water bath and cleaned, after which they are ready for shipment to opticians or prescription shops.

From the foregoing description, it will be apparent that the method, as provided in accordance with this invention, presents numerous advantages: A lens blank manufacturer may purchase molded lens blanks of identical curvature. The manufacturer may then use these lens blanks to manufacture lens blanks having a large assortment of different toric curves formed on the concave surfaces thereof. This is accomplished by having an inventory of the ceramic blocks 11, groups of which are ground to the different toric curvatures normally required by the opticians and prescription shops. Use of the ceramic blocks and the heating process makes it possible to preshape the molded lens blanks, thereby to eliminate massive grinding of the concave surfaces of the lens blanks in order to obtain the desired toric curves. There is the further advantage that wear on grinding wheels is reduced to a minimum whereby a large number of lenses may be ground on a particular wheel before the surface wears to any substantial degree. Thus, accuracy of grinding is maintained throughout the life of a grinding wheel. The method employs the rotating toric principle in the generation and finishing of the astigmatic correction on the concave surface of the lens. This principle makes possible the manufacture of lenses having superior optical advantages which inherently improve the vision.

The method of this invention also has a distinct advantage in simplifying the blocking procedures. It is not necessary to mount a number of blocks on a wheel as required by the wheel method of the Bugbee patent. This saves a substantial amount of time and procedures which create fumes and dirty conditions in a manufacturing plant. Other advantages will be readily apparent to those skilled in the art.

It should be understood that the term "Lens" as used herein may be interpreted as defining lens blanks as obtained from glass manufacturers and uncut, or semi-finished or finished lenses as supplied by lens manufacturers to opticians and prescription shops. It should be understood that the term "generating" as used herein may be interpreted as including "polishing" and "grinding."

The invention claimed is:

1. A method of making a lens having a concave toric surface comprising the steps of placing a lens on a support having the counterpart configuration of a desired concave toric lens surface, subjecting said lens to heat sufficient to cause said lens to sag into fitting contact with said support thereby to form the desired concave toric lens surface on one side of said lens, placing said one side of said lens against a grinding wheel having the same counterpart toric configuration as said support and orienting said lens so that the one side of said lens fits said grinding wheel, and rotating said grinding wheel so as to grind the one side of said lens.

2. The mehtod of claim 1 wherein said grinding is accomplished by oscillating said lens crosswise of said wheel simultaneously with said rotating of said grinding wheel.

3. The method of claim 2 additionally comprising the subsequent steps of placing said one side of said lens against a polishing wheel having the same counterpart toric configuration as said support and orienting said lens so that the one side of said lens fits said polishing wheel, and simultaneously rotating said polishing wheel and oscillating said lens crosswise of said polishing wheel.

4. Apparatus for making lenses having concave toric surfaces comprising a generating wheel having an outwardly facing convex generating surface with a maximum radius and cross-curvature conforming to the desired radii of curvature of the concave lens surface, a shaft having said wheel fixedly mounted thereon, a frame rotatably mounting said shaft, drive means coupled to said shaft for the rotation of said wheel about its axis, a first rod, a lens holder having a recess therein formed to receive a lens for generating thereof, said lens holder being mounted centrally thereof on said first rod in swivelling ball and socket fashion, bracket means fixed to said frame and having a pair of vertically extending slots, an annular guide member having oppositely extending projections received in said slots, a piston motor mounted on said frame with its piston rod projectable and retractable parallel to the axis of rotation of said wheel, said first rod being pivotally mounted on said piston rod and extending through said guide member to said ball and socket support, said lens holder being dependingly positioned by said ball and socket arrangement above said wheel whereby a lens within said holder is positioned against said wheel.

5. Apparatus for making lenses having concave toric surfaces comprising a generating wheel having an outwardly facing convex generating surface with a radius and cross-curvature conforming to the desired radii of curvature of the concave lens surface, a frame rotatably mounting said wheel, drive means coupled to said wheel for the rotation of said wheel in a given direction about its axis, a first rod, a lens holder having a recess therein formed to receive a lens for generating thereof, said lens holder being mounted centrally thereof on said first rod in swivelling ball and socket fashion, bracket means fixed to said frame and including a pair of upright guide members on opposite sides of said rod and spaced in the given direction and having a pair of vertically extending slots, an annular guide member having oppositely extending projections received in said slots, a piston motor mounted on said frame with its piston rod projectable and retractable parallel to the axis of rotation of said wheel, said first rod being pivotally mounted on said piston rod and extending through said guide member to said ball and socket support, said lens holder being dependingly positioned by said ball and socket arrangement above said wheel whereby a lens within said holder is positioned against said wheel and is held thereagainst by gravity acting on said lens holder and associated structure.

References Cited

UNITED STATES PATENTS

| | | | |
|---|---|---|---|
| 886,310 | 4/1908 | Wennstrom | 51—96 |
| 1,140,421 | 5/1915 | Wall et al. | 51—96 |
| 1,287,091 | 12/1918 | Pearson | 51—96 |
| 1,483,866 | 2/1924 | Bugbee | 51—284 |
| 1,643,978 | 10/1927 | Bugbee | 51—96 X |
| 1,677,382 | 7/1928 | Bugbee | 51—284 |
| 1,995,676 | 3/1935 | Gagnon et al. | 51—284 X |
| 2,482,698 | 9/1949 | Tillyer | 51—284 X |
| 3,012,379 | 12/1961 | Kuhlman | 51—96 X |

LESTER M. SWINGLE, *Primary Examiner.*